(12) United States Patent
Logan et al.

(10) Patent No.: US 6,510,402 B1
(45) Date of Patent: Jan. 21, 2003

(54) COMPONENT TESTING WITH A CLIENT SYSTEM IN AN INTEGRATED TEST ENVIRONMENT NETWORK

(75) Inventors: Timothy Dennis Logan, Walnut Creek, CA (US); Pudur S. Ramaswamy, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/244,470

(22) Filed: Feb. 4, 1999

(51) Int. Cl.⁷ .......................... G06F 13/00; G06F 11/00
(52) U.S. Cl. .................. 702/186; 702/186; 714/38; 709/319; 709/203
(58) Field of Search .............................. 702/186; 707/1, 707/200; 717/4, 11; 709/203, 319; 714/38

(56) References Cited

U.S. PATENT DOCUMENTS

| | | | |
|---|---|---|---|
| 4,595,981 A | | 6/1986 | Leung ........................ 364/300 |
| 5,357,452 A | | 10/1994 | Pio-di-Savoia et al. ..... 364/579 |
| 5,359,546 A | | 10/1994 | Hayes et al. ................ 364/579 |
| 5,371,883 A | * | 12/1994 | Gross et al. ................ 395/575 |
| 5,421,004 A | | 5/1995 | Carpenter et al. .......... 395/575 |
| 5,604,906 A | * | 2/1997 | Murphy et al. ............. 395/712 |
| 5,651,111 A | | 7/1997 | McKeeman et al. ... 395/183.14 |
| 5,784,553 A | | 7/1998 | Kolawa et al. ............... 714/38 |
| 5,915,113 A | * | 6/1999 | McDonald et al. ......... 395/702 |
| 6,011,918 A | * | 1/2000 | Cohen et al. ............... 395/703 |
| 6,080,207 A | * | 6/2000 | Kroenhing et al. ........... 717/11 |
| 6,108,697 A | * | 8/2000 | Raymond et al. ........... 709/218 |
| 6,182,245 B1 | * | 1/2001 | Akin et al. ................... 714/38 |
| 6,192,477 B1 | * | 2/2001 | Corthell ...................... 713/201 |
| 6,195,765 B1 | * | 2/2001 | Kislanko et al. .............. 714/38 |
| 6,240,442 B1 | * | 5/2001 | Domenikos et al. ........ 709/203 |
| 6,256,704 B1 | * | 7/2001 | Hlava et al. ................ 711/112 |
| 6,304,982 B1 | * | 10/2001 | Mongan et al. ............... 714/38 |

OTHER PUBLICATIONS

Chung & Kwon, 1994, Journal: Microprocessor and Microprogramming V40 (abstract only).*
Biggs, 1998, Source: Infoworld v20 (abstract only).*
Knowles, 1996, Source: R/S Magazine v5 p36 (abstract only).*
Linthicum, 1995, Source: DBMS v8 p 22 (abstract only).*
Test Case Source Code Generator—IBM Technical Disclosure Bulletin, Feb. 1992.
"Take an in–depth look at the Java Reflection API,"*Java-World* Sep. 1997.
"5) Software Development," *Monthly Newsletter* , Jun. 23, 1998.
"Developing An Integrated Testing Environment Using the World Wide Web Technology," Jerry Z. Gao et al., 594–601 *IEEE* 1997.

* cited by examiner

Primary Examiner—Marc S. Hoff
Assistant Examiner—Paul Kim
(74) Attorney, Agent, or Firm—Sawyer Law Group LLC

(57) ABSTRACT

Method and system aspects for performing component testing with a client system in an integrated test environment network are described. In a method aspect, the method includes retrieving one or more test suites and associated platform partitions from at least one server system to initiate component testing. The method further includes performing test cases for the test suites, and providing results of the test cases to the at least one server system.

16 Claims, 4 Drawing Sheets

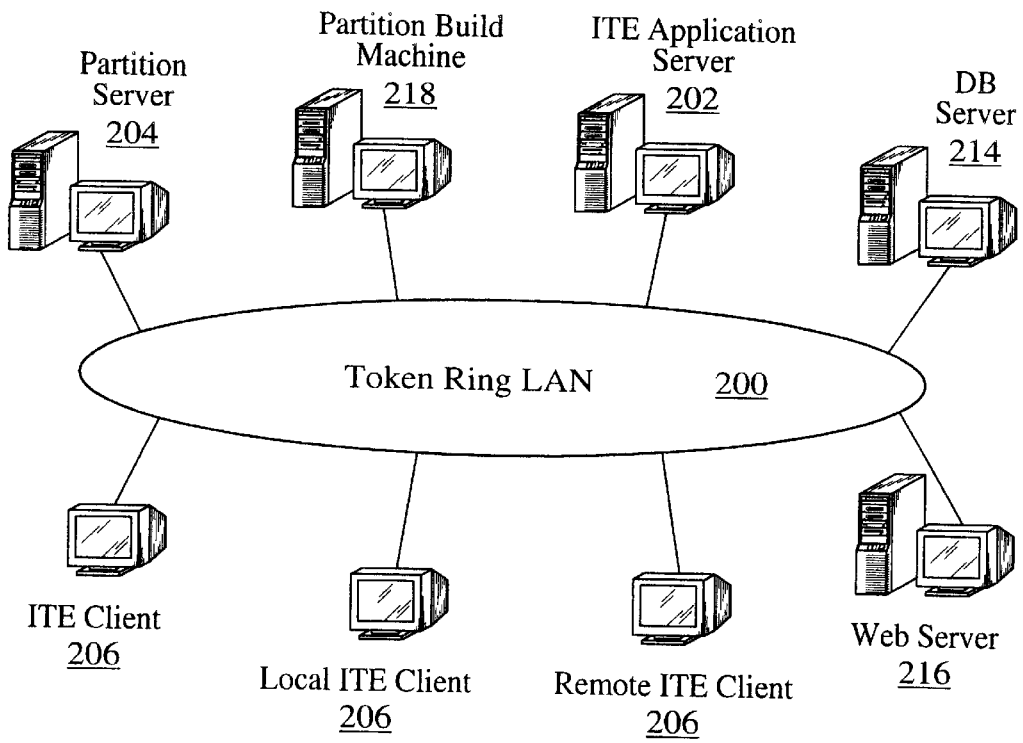
FIG. 1
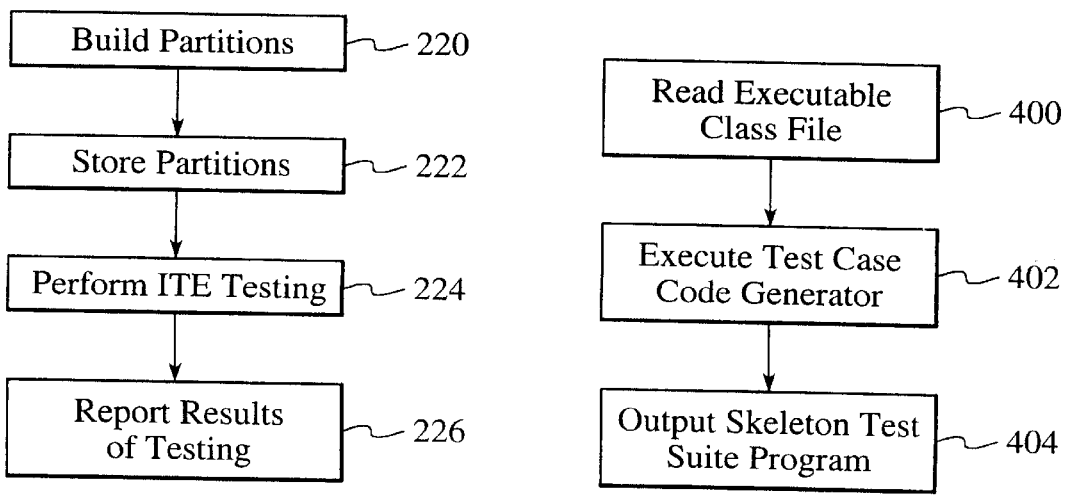
FIG. 2
FIG. 5

COMPONENT TESTING WITH A CLIENT SYSTEM IN AN INTEGRATED TEST ENVIRONMENT NETWORK

RELATED APPLICATIONS

The present invention is related to co-pending U.S. patent application Ser. No. 09/244,976 entitled AUTOMATIC TEST FRAMEWORK SYSTEM AND METHOD IN SOFTWARE COMPONENT TESTING, and co-pending U.S. patent application Ser. No. 09/244,919 entitled SERVER SYSTEM FOR COORDINATING UTILIZATION OF AN INTEGRATED TEST ENVIRONMENT FOR COMPONENT TESTING, both of which are assigned to the assignee of the present invention, and filed on even date herewith.

TECHNICAL FIELD

This patent application is related generally to software component development, and more particularly to an integrated test environment for testing software components.

BACKGROUND

The development and use of the JAVA programming language from Sun Microsystems of Mountain View, Calif. has greatly influenced today's computing environment. Software developers are turning to creating components, rather than monolithic applications, to free themselves from slow, expensive application development and to build up a portable reusable code base. This enables developers to quickly attack new market opportunities, new joint development opportunities, and new ways to sell smaller packages of software.

Components, including Java 'Beans', and frameworks and class libraries, are designed to provide standard solutions to common problems that can be easily extended to deliver tailored solutions. JavaBeans is generally known as a portable, platform-independent component model written in JAVA and intended to work in a visual development tool. The entire runtime environment required by JavaBeans is part of the JAVA platform. JavaBeans allow developers to write reusable components once and run them anywhere, i.e., on any platform. Thus, JavaBean components or Beans are reusable software components that can be manipulated visually in a builder tool and can be combined to create JAVA applications or Web-centric applets.

With the ability to develop commercial components in JAVA that can be written once and run anywhere, the reliability of functionality of the components is crucial. Ensuring the integrity of the component product through thorough and high quality testing thus becomes a paramount concern for developers.

The traditional approach to assuring quality in software products has been to involve a Quality Assurance (QA) group late in the development process to test the end product. The difficulty with the "end of assembly line" approach to QA is that quality and testability have to be engineered into a product throughout the development life cycle. Unless the developers are mindful of clear quality objectives and are equipped with the tools to measure progress toward the objectives, quality cannot be ensured on a consistent basis. Integrated Development Environments, such as IBM's VisualAge product suite, have attempted to provide a unified environment for development engineers' tools, including source code editors, source code managers, compilation tools, and run time debuggers. However, a need still exists for an improved approach for more efficient and effective software component testing that integrates the tools and data needed by test engineers.

Further, in software testing, particularly performance testing, it is important to begin with the same base environment in order to conduct repeatable tests. For example, given the large number of run environments for JavaBeans, having a dedicated machine for each JAVA runtime environment to ensure the same base environment increases the hardware costs beyond reason. However, without the use of dedicated machines, inordinate amounts of time are necessary to knock down and rebuild the test environment as required by each suite of tests on the various platforms. Accordingly, an innovative approach is needed to manage the testing environment that provides a clean testing environment for each test.

SUMMARY

The present invention meets these needs and provides method and system aspects for performing component testing with a client system in an integrated test environment network. In a method aspect, the method includes retrieving one or more test suites and associated platform partitions from at least one server system to initiate component testing. The method further includes performing test cases for the test suites, and providing results of the test cases to the at least one server system.

With the present invention, an efficient approach to performing component testing is achieved. Automatic test framework capabilities increase consistency and reduce manual hand-coding requirements for developing and running test cases. Further, innovative use of partition images ensures the integrity of test environments without requiring a concomitant expense of having multiple dedicated machines for each platform for which a component is tested. Reliability and consistency of testing are thus effectively achieved through the present invention. Additionally, the integrated test environment achieved by the present invention through the use of a single Client user interface, a database server, application server, web server and client application code integrates the tools and data needed by test engineers. The testing tools include facilities for: developing and executing suites of related test cases, developing and executing testing checklists, documenting and tracking software defects discovered in the course of testing, help files and other documentation defining the testing standards, methods and procedures and centralized reporting facilities. Further, the integrated test environment implements an open architecture to enable third party plug-ins to extend the integrated test environment user interface, making these tools available through the common user interface as well. These and other advantages of the aspects of the present invention will be more fully understood in conjunction with the following detailed description and accompanying drawings.

BRIEF DESCRIPTION OF THE DRAWINGS

FIG. 1 illustrates an integrated test environment (ITE) network in accordance with a preferred embodiment of the present invention.

FIG. 2 illustrates a block diagram of an overall process for utilizing the integrated test environment represented in FIG. 1 in accordance with the present invention.

FIG. 5 illustrates a block flow diagram for utilizing a test case code generator software program as a text execution mechanism within the ITE clients.

DETAILED DESCRIPTION

Figure 3:
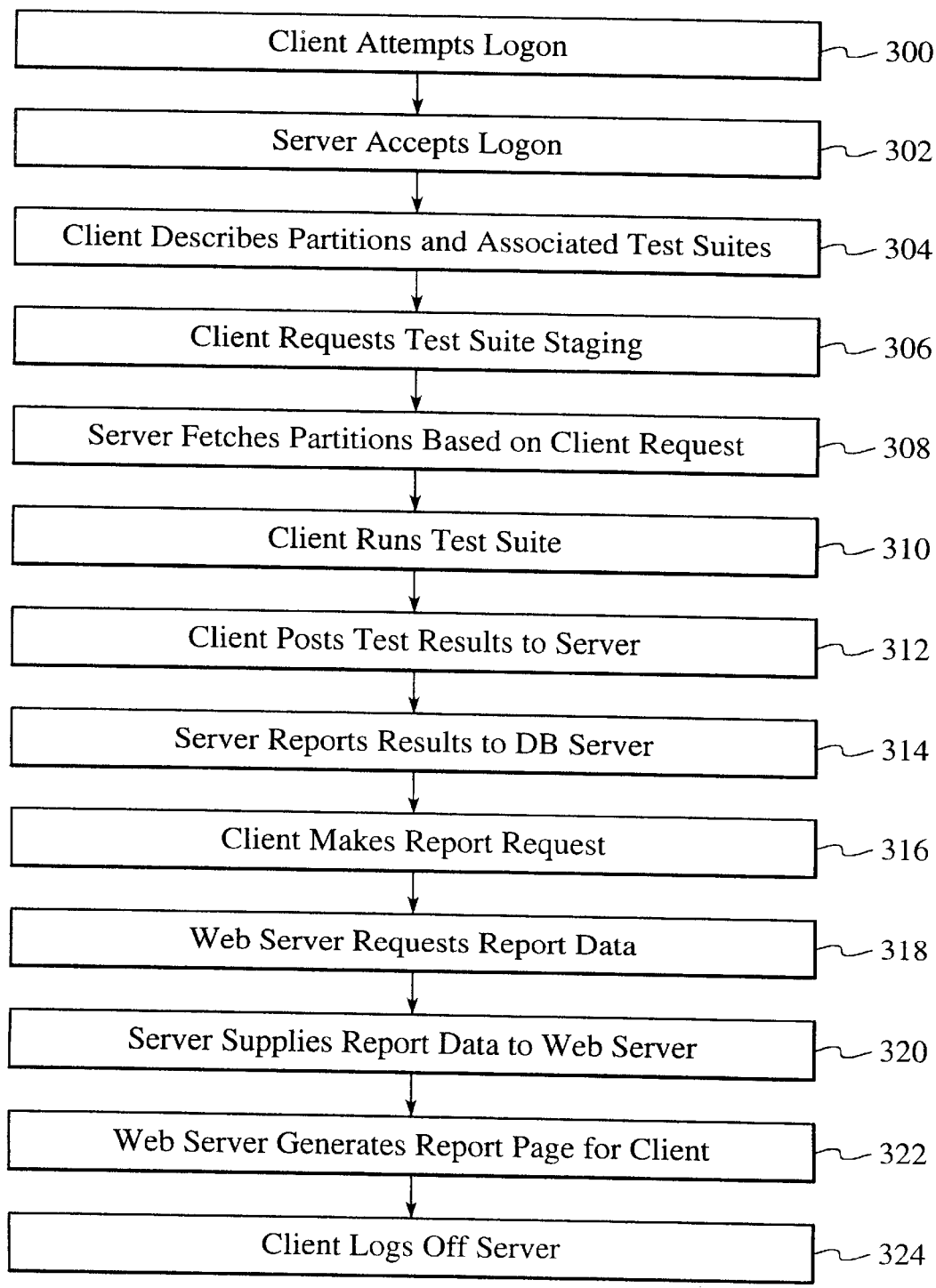
FIG. 3 illustrates a block flow diagram for steps involved in performing ITE testing.

The present invention relates to an integrated test environment for component testing. The following description is presented to enable one of ordinary skill in the art to make and use the invention and is provided in the context of a patent application and its requirements. Various modifications to the preferred embodiment and the generic principles and features described herein will be readily apparent to those skilled in the art. For example, the present invention is described in terms of an environment utilizing the capabilities of JAVA programming and more particularly, features of the Java Development Kit (JDK) 1.1, as well as JAVA's incorporation of Internet standards that facilitate the development of cross-platform distributed tools. However, this is meant as illustrative of a preferred embodiment, the aspects of which may be achieved utilizing other potentially, substantially equivalent programming languages.

The aspects of the present invention provide an integrated environment for component testing that automates test case code generation, utilizes a partition server to achieve a clean test environment for each test suite, where a test suite refers to a collection of related test cases, and performs the testing on a client workstation in conjunction with a system of servers. FIG. 1 illustrates a preferred logical local area network (LAN) diagram in accordance with these aspects of the present invention. The LAN 200 suitably includes an integrated test environment (ITE) application server 202, a partition server 204, ITE client machines 206, a database (DB) server 214, a Web server 216, and a partition build machine 218. The ITE server 202 is preferably run, for example, on a PENTIUM II or higher machine having at least 128 MB (megabytes) of RAM (random access memory), a SCSI disk controller, and with a drive size of at least 8 GB (gigabytes). The partition build machine 218 is utilized to create and warehouse compressed partition images on, for example, a PENTIUM II, or better machine, having at least 128 MB of RAM, a SCSI controller, and at least a 40 GB disk drive. ITE clients 206 are workstations, either local or remote, for example PENTIUM II machines, with disk drives managed as partitions, including the reuse of standard compressed partition images from the partition server 204, as described in more detail with reference to FIG. 2. The partitions on the ITE clients 206 include a reusable scratchpad area that gets overlaid with decompressed partition images from the partition server 204, a partition that contains data saved locally, and a small partition that contains the tools necessary to manage the partitions, e.g., Partition Magic and Drive Image from PowerQuest Corporation of Orem, Utah. The DB server 214, for example, a PENTIUM II, or better machine, acts as a mechanism for capturing test results and reporting them on a Website on the Web server 216, e.g., a PENTIUM II or better machine, via dynamic HTML (hypertext markup language).

FIG. 2 illustrates a block diagram of an overall process for utilizing the integrated test environment represented in FIG. 1 in accordance with the present invention. The process begins with the building of partitions on the partition build machine 218 (step 220). The partition build machine 218 provides a system for constructing each partition image and acts as the only machine where time-consuming and complicated software installs are done and done once. As an example, a partition designed to run browser tests under Microsoft's Windows NT™, i.e., an "NT Browser" partition image, is built on partition build machine 218 to contain the NT operating system, Netscape™ from Netscape, and Internet Explorer™ from Microsoft. Once built, the partition is compressed using an appropriate compression tool, e.g., Drive Image from PowerQuest, that creates a compressed image file of an individual partition or entire hard drive, and which is then stored on the partition server 204 (step 222). The compressed partition may then be downloaded to provide a quick, clean environment every time a test for that environment is performed. For the browser example, the saved NT Browser partition image may be downloaded to the C:\partition of any ITE client workstation 206 as the starting point for browser-based testing. It should be appreciated that the use of partitions in the ITE client 206 may result in the need to use a boot disk to boot the ITE client 206. The provision of a partition server 204 in accordance with the present invention effectively reduces the number of machines needed to support component testing on multiple platforms, while ensuring the integrity of the test environment for each platform.

With the partitions built and stored, testing in the integrated test environment is then performed (step 224) via the ITE application server 202 and clients 206, as described in more detail hereinbelow with reference to FIGS. 3 and 4. The results of the testing are then stored in the DB server 214 and reported to the ITE client 206 by the Web server 216 (step 226).

Figure 4:
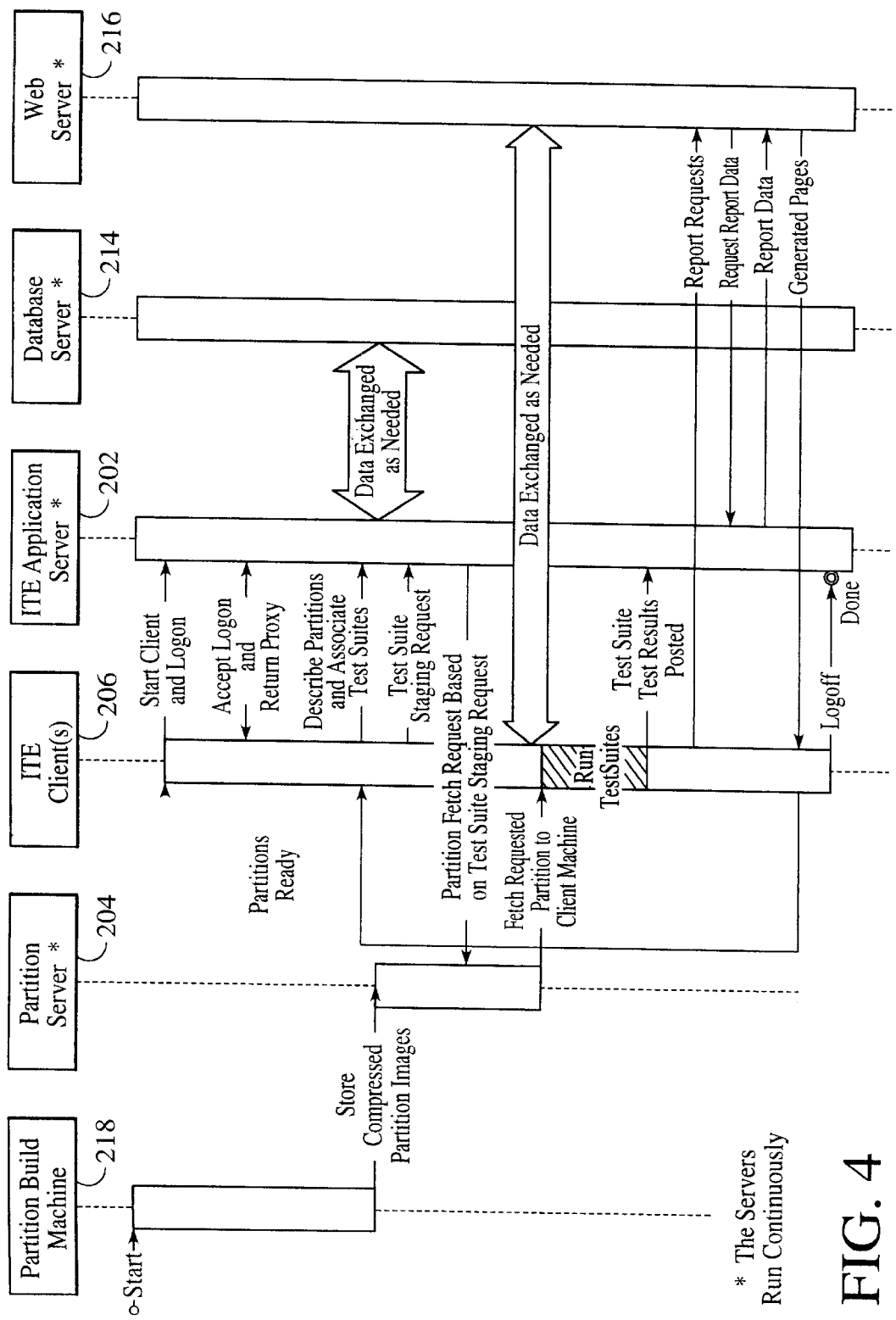
FIG. 4 illustrates a schematic event and system diagram for FIG. 3.

Referring now to FIGS. 3 and 4, FIG. 3 illustrates a block flow diagram for steps involved in performing ITE testing, as represented in the schematic event and system diagram of FIG. 4. The testing initiates via a suitable Web page browser interface on the ITE client 206 from which a logon attempt to the ITE application server 202 is made (step 300). For example, the ITE client 206 uses Java's Object Request Broker architecture (Remote Method Invocation) to connect to the ITE server 202. The ITE server 202 accepts the logon and returns a proxy object, which is used by the client 206 to make calls to the ITE server 202 as if the ITE server 202 were a local process, as is well understood by those skilled in the art (step 302). Once the ITE client 206 is logged on to the ITE server 202, the desired partition and associated test suites for performing the test are selected (step 304). In a preferred embodiment, the contents of the desired partition are preferably documented and associated with the test suites that depend on them.

The ITE client 206 then issues test suite staging requests to the ITE server 202 (step 306). The ITE server 202 fetches the compressed partition on behalf of the client from the partition server 204 based on the test suite staging requests (step 308). The appropriate partitions are then extracted from the partition server 204 and copied to the ITE client 206. The ITE client 206 then runs the test suite (step 310). For purposes of this discussion, a test suite refers to individual test cases and checklists used to test a feature of a component. By way of example, the following code sample represents test cases for a test suite for a text file reader component. A TestSuite for a text file reader component might include the following test cases, among others:

Protected Attribute Initialization Tests 1. lineSeparator initialized to new line character
2. fileInputStream object initialized to null Public Method Tests
  3. getEncoding#1 Returned default encoding should match default JAVA encoding from Locale
  4. setEncoding#1 To "8859_1" (ISO Latin-1) without failing
  5. setEncoding#2 Verify that getEncoding( ) returns "8859_1" ISO Latin-1 after set An example of testcase code developed from the TestSuite skeleton follows:

```
private String
    EOL = System.getProperty( "line.separator" ),
    ENCODING = System.getProperty( "file.encoding" );
// *****************************************
// PROTECTED ATTRIBUTE INITIALIZATION
// *****************************************
//
if( testObject.lineSeparator.equals( EOL ) )
    outcome = TestCase.PASS;
else
    outcome = TestCase.FAIL;
execute( new TestCase( component, certUnit, "init-lineSeparator", outcome,
    testObject.lineSeparator == null ? "null" : testObject.lineSeparator ) );
if( testObject.fileInputStream == null )
    outcome = TestCase.PASS;
else
    outcome = TestCase.FAIL;
execute( new TestCase( component, certUnit, "init-fileInputStream", outcome,
    testObject.fileInputStream == null ? "null" : testObject.fileInputStream.toString() ) );
// ****************
// PUBLIC METHOD
// ****************
// Returned default encoding should match default JAVA encoding
//
java.lang.String r2;
r2 = testObject.getEncoding( );
if( r2.equals( ENCODING ) )
    outcome = TestCase.PASS;
else
    outcome = TestCase.FAIL;
execute( new TestCase( component, certUnit, "getEncoding#1", outcome,
    r2 == null ? "null" : r2.toString() ) );
//
// To "8859_1" (ISO Latin-1) without failing
//
java.lang.String p3 = "8859_1";
testObject.setEncoding( p3 );
outcome = TestCase.PASS;
execute( new TestCase( component, certUnit, "setEncoding#1", outcome ) );
//
// Verify that getEncoding() returns "8859_1" ISO Latin-1 after set
//
r2 = testObject.getEncoding( );
if( r2.equals( p3 ) )
    outcome = TestCase.PASS;
else
    outcome = TestCase.FAIL;
execute( new TestCase( component, certUnit, "getEncoding#2", outcome,
    r2 == null ? "null" : r2.toString() ) );
```

The testcases above are examples of background tests. Interactive tests take a prompt string in place of the last two arguments passed to the execute method. This prompt is then presented by the testing framework, at runtime, and the true/false response is taken as the outcome of the test. For example:
  chartObject.setChartType( Chart.PIECHART );
  execute( new TestCase( component, certUnit, "Chart#test1", "Do you see an a PIE CHART now?"));

A checklist is a special case of an interactive test suite. The checklist items presented by the framework are not based on introspection of class files, but rather, use entries placed into the integrated test environment database 214 to determine the content of the checklist. The checklist items are presented to the test engineer at test execution time, just like the previous interactive test example, and the test engineer chooses between responses like: PASS, FAIL, BYPASS, KNOWN PROBLEM, as each checklist item is executed manually. Checklists are intended to support manual testing efforts, like downloading a product off the Web, for example:
  1. Navigate to website
  2. Go to download page
  3. Download software component to client machine
  4. Extract the contents of the downloaded file
  5. Install the component software from the extracted files
  6. Review license and copyright information The ITE test software preferably runs in its own partition on the ITE client 206. The C:\partition of the ITE client 206 is treated as transient data that gets overlaid with images from the partition server 204, as described previously. The test suites are run locally on the ITE client machines 206, and the outcomes of the test cases are stored locally in memory on the ITE client 206, so that latency in transacting with the ITE server 202 does not impact the test results.

Further, the present invention utilizes a central repository of production test suites in the ITE server 202. The test suites are loaded from the repository, at run time, to perform regression testing (i.e., repeating an established suite of tests to make sure there are no unintended changes in the behavior of the software induced by the addition of new features or fixes). When test suite code is being developed or revised, it is copied onto an ITE client machine 206 and is then modified and executed using the client version, not the server version of the code. In other words, the repository of test suites is managed like a code repository with the only difference being that the runtime hook determines if the test suite should be fetched locally or from the remote repository. A number of commercially available tools such as IBM's CMVC and Rational Corporation's ClearCase are suitable for use to manage the test suite repository. In this way, a test engineer always knows where to go to get the production version of a test suite, so that any team member can perform regression testing without having to worry about which machine holds the current version of the test. Further, repository software usually implements the idea of checking components in and out, since it is easily determined if a test suite is being modified and who is making modifications.

In accordance with a further embodiment of the present invention, an automatic test case code generator is utilized to reduce the amount of manual coding required to develop each individual test case within a given test suite. When testing components, e.g., JavaBeans, each executable class within the component must be tested. About 1000–1200 lines of code are typically needed to do low level API (Application Programming Interface) testing of a class file. In order to reduce the tedious and time-consuming process of hand-coding tests for each method within a component, the present invention utilizes a test case code generator software program within the ITE clients 206, as described with reference to FIG. 5, to generate a basic core API test skeleton program that systematically exposes all protected methods, constructors and attributes, and makes calls to all methods contained in a subject class. The utilization includes reading a class file for testing (step 400) and testing by the test case code generator (step 402). In a preferred embodiment, the test case code generator generates the skeleton test cases by way of the java.introspection facility from Java's java.lang.reflect package to test the API calls within a class and provides an exhaustive core API unit test case of a given class. The introspection facility of JAVA is provided at run-time to query a class and identify what methods are in the class. The introspection facility also determines what arguments a method takes, the data type of each argument, what data types are returned and which exceptions are thrown, if any. The test case code generator portion of the ITE client 206 suitably performs automatic test case generation based on return type when possible, as well as trapping exceptions. For example, when a Boolean setter method is detected, the test case code generator creates code to automatically check that the default Boolean value is correct, changes it to the opposite Boolean value, insures that the change occurs properly, and returns the value to the default value. Thus, a skeleton test suite program is generated (step 404) that can then be individualized for specific test cases of the component and integrates into the testing execution framework to automatically execute each test case and post test results to the common repository.

The skeleton program, as its name implies, provides a basic test structure and improves the testing environment by reducing the hand-coding of individual test cases for a method to a minimal number of lines, which saves time and improves consistency, while ensuring the integrity of the lowest level API calls of a method. In accordance with the present invention, the testing skeleton supports definition and execution of three major types of tests: background automated tests, interactive automated tests, and automatic checklist processing to support manual testing activities, as previously described in the code example presented above in conjunction with FIG. 3. Thus, background tests include those where the expected outcome of the test is known, so that a simple comparison between the expected outcome and the actual outcome can be performed in the background to test for proper functioning. Interactive tests refer to those tests where feedback is required, e.g., 'Do you see a bar graph now?', with the identification of proper functioning determined by the interactive feedback provided. Checklists provide a straightforward mechanism for ensuring that quality checks are performed in a complete and consistent manner.

Figure 6:
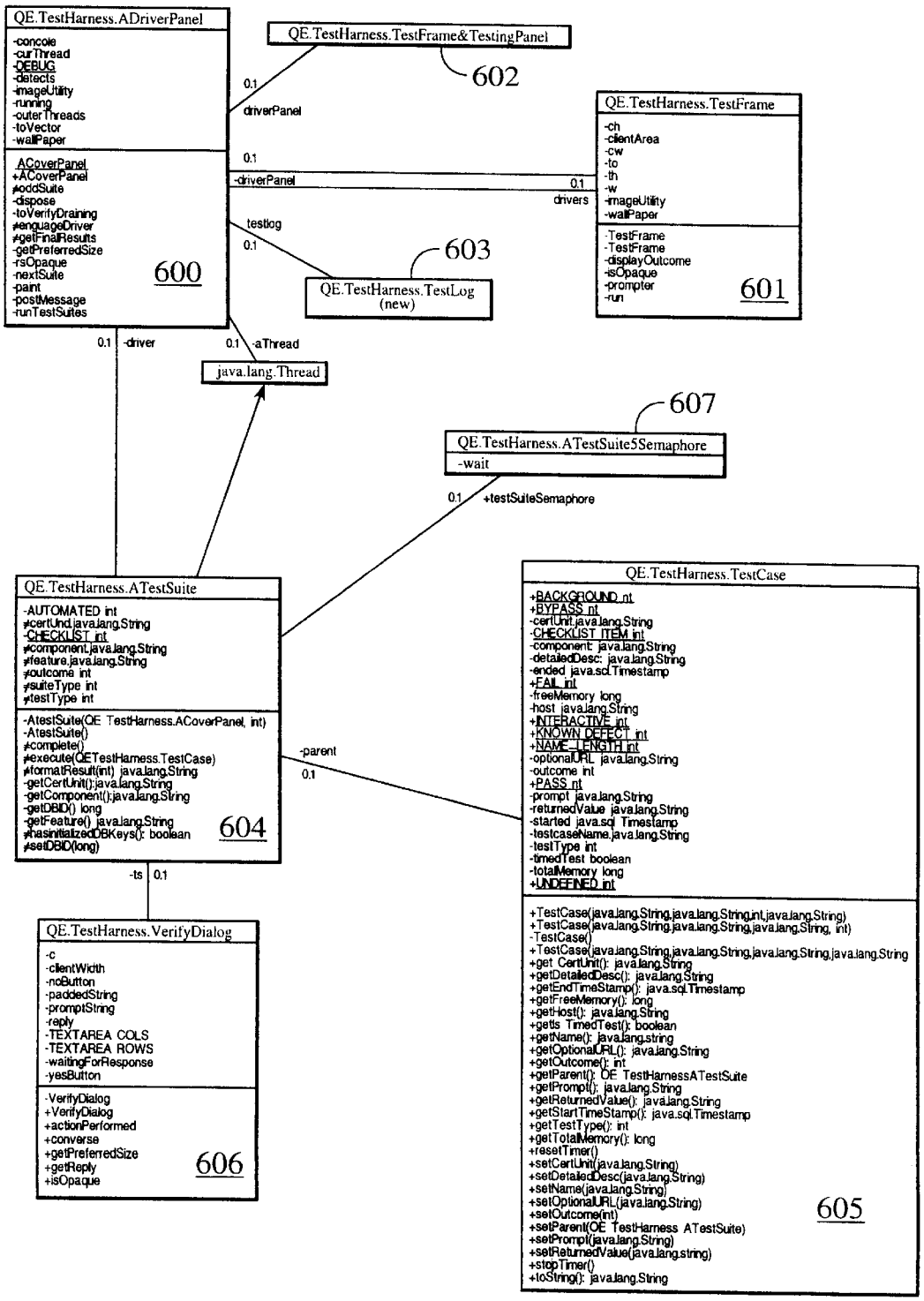
FIG. 6 illustrates a class relationship diagram of a test execution framework in accordance with the present invention.

FIG. 6 illustrates a diagram of the class relationship of the test execution framework that run on the ITE client 206 in accordance with the present invention. The framework on the ITE client 206 instantiates the software objects being tested, drives the execution of test suites, captures responses for interactive test cases, catches and deals with exceptions and generates the test results transaction, which it then passes to the ITE application server 202 to be posted to the database server 214. The test engineer developing a test suite gets all of these services "for free" by extending the Driver Panel and Test Suite classes. The abstract class ADriverPanel 600 implements methods that facilitate and control the execution of test suites on the ITE client 206. AdriverPanel 600 constructs a TestFrame 601 frame window that contains a TestingPanel object 602 which, in turn, contains any graphical elements of the component software being tested. AdriverPanel 600 also creates a TestLog 603 object to optionally record test results to a local text file on the ITE client 206. ADriverPanel is further responsible for posting the test results to the database server 214 via the postResult( ) method.

AtestSuite 604 is executed by a "panel class" that extends ADriverPanel 600 which calls the addSuite( ) method to add an instance of each TestSuite that is to be run within the scope of the driver and then calls the engageDriver( ) method to actually execute the TestCases contained within the TestSuite. A sample of the preferred code for the text file reader example component follows:

```
// FileTextReaderPnl.java generated by the SkelGen utility on Wed Dec 23 13:38:24 PST 1998
// © Copyright 1998, IBM Corporation. Author Tim Logan.
//
// FileTextReaderPnl.java
package Tests.FileTextReader;
import java.awt.*;
```

-continued

```
import java.awt.event.*;
import java.util.*;
import com.sun.java.swing.*;
import util.Streams.*;
import QE.Client.Console;
import QE.TestHarness.*;
import Tests.FileTextReader.FileTextReaderCore;
/**
    * This class drives the execution of the FileTextReaderCore test suite
    */
//****************************************************************
    public class FileTextReaderPnl extends ADriverPanel
//****************************************************************
{
    //----------------------------------------------------------------
                public FileTextReaderPnl( Console console, String driverTitle )
    //----------------------------------------------------------------
    {
        super( console, driverTitle );
    };
    //----------------------------------------------------------------
        public void runTestSuites()
    //----------------------------------------------------------------
    {
    //
    // Instantiate the TestSuite thread objects that will be run serially. The first one (the
    // core API TestSuite) is generated for you.
    //
        addSuite( new FileTextReaderCore( this ) );
    //
    //      Your custom TestSuites here . . .
    //
    engageDriver();
    };
};
```

A test suite extends the abstract class ATestSuite 604. TestSuites are owned by AdriverPanel 600 and contain TestCases 605 in a parent relationship, as shown in the diagram of FIG. 6.

```
//*********************************************************
    public class FileTextReaderCore
        extends ATestSuite
```

-continued

```
//*********************************************************
```

As shown by the diagram of FIG. 6, each AtestSuite 604 object runs on it's own thread by inheriting from java.lang.Thread. The testing logic is contained in an implementation of the run( ) method which executes calls to the parent ATestSuite.execute( ) method, passing new instances of TestCase 605 objects as follows:

```
//----------------------------------------------------------------
    public void run()
//----------------------------------------------------------------
{
    int outcome = TestCase.PASS;
    //
    //*************
    // background test
    //*************
    //
            if( *WHATEVER YOUR TEST CONDITION IS* == true )
                outcome = TestCase.PASS;
        else
                outcome = TestCase.FAIL;
        execute( new TestCase( "componentName", certificationUnitName","testName",
                outcome, resultObject == null ? "null" : resultObject.toString() ) );
    //
    //*************
    // interactive test
    //*************
    //
    execute( new TestCase( "componentName", certificationUnitName","testName",
```

-continued

```
        "Interactive Prompt String Goes Here" ) );
    //
    // when all TestCases have been executed, call . . .
    //
        complete();
};
```

The VerifyDialog 606 object that is created whenever an interactive prompt string is passed in a TestCase constructor blocks the TestSuite thread using the ATestSuite$Semaphore 607 object while waiting for the user to respond to the interactive prompt.

Referring again to FIG. 3, once the tests are completed in the ITE client 206, the test suite test results are posted from the ITE client 206 to the ITE server 202 (step 312), and the ITE server 202 posts the test results as a single transaction to the DB server 214 (step 314). The ITE client 206 also makes a report request to the Web server 216 (step 316). The Web server 216 then requests the report data from the ITE server 202 (step 318), which the ITE server 202 sends in response to the Web server 216 (step 320). The Web server 216 provides the report Web pages generated to the ITE client 206 (step 322). The client can then continue testing with another test suite if desired, with testing via the ITE environment completed for the client 206 when the client logs off of the ITE server 202 (step 324). The above-described interactions with the DB server 214 occur through the ITE server 202. Data is exchanged between the ITE server 202 and the DB server 214 as needed. The interactions described between the ITE client 206 and the ITE server 202 are transaction-based, as are the exchanges between the Web server 216 and the ITE server 202, as is well understood by those skilled in the art.

Through the present invention, an integrated test environment successfully performs component testing with consistency and efficiency. In addition, the integrated test environment may be extended to provide utility classes to instrument code, perform lint-like code clean-up, enforce coding standards, support conditional compilation, do method signature deprecation analysis between releases, and automatically generate documentation, for example.

Although the present invention has been described in accordance with the embodiments shown, one of ordinary skill in the art will readily recognize that there could be variations to the embodiments and those variations would be within the spirit and scope of the above-described system and method. For example, to include remote client machines, some adjustments to the network may be needed, such as the inclusion of firewall machines, as is well understood by those skilled in the art. Further, although the aspects of the test case code generator are described as a portion of the ITE client application, these aspects may also be achieved for use as a stand-alone application, if desired. Accordingly, many modifications may be made by one of ordinary skill in the art without departing from the spirit and scope of the appended claims.

What is claimed is:

1. A method allowing a client system to perform testing of components in an integrated test environment network, the method comprising the steps of:

a) retrieving at least one test suite and at least one associated platform partition from at least one server system to initiate component testing;

b) performing test cases for the at least one test suite; and c) providing results of the test cases to the at least one server system.

2. The method of claim 1 further comprising the step of (d) managing a hard disk drive of the client system as a series of partitions.

3. The method of claim 2 wherein the series of partitions further comprises a reusable scratchpad area, local data storage area, and partition management tool area.

4. The method of claim 3 wherein the retrieving step (a) further comprises the step of (a1) retrieving the at least one associated platform partition for performing the test cases from a partition server.

5. The method of claim 4 wherein the reusable scratchpad area gets overlaid with decompressed partition images from the partition server.

6. A method for performing component testing with a client system in an integrated test environment network, the method comprising the steps of:

a) logging on to a server;

b) describing desired partitions and associated test suites to the server;

c) requesting test suite staging from the server;

d) running test suites returned by the server; and e) posting test suite test results to the server.

7. The method of claim 6 further comprising the steps of (f) making report requests to a Web server.

8. The method of claim 7 further comprising the step of (g) reporting the response to the report requests from the Web server.

9. The method of claim 8 further comprising the step of (h) logging off of the server to end testing by the client system.

10. The method of claim 6 wherein the running step (d) further comprises the step of (d1) performing individualized test cases to test the component.

11. The method of claim 6 wherein running step (d) test suites further comprises the step of (d1) running the test suites on the desired partition, the desired partition provided by a partition server.

12. A integrated test environment network system for performing tests on software components in an integrated test environment network, the system comprising:

at least one server system; and at least one client system coupled to the at least one server system, the at least one client system retrieving one or more test suites and associated platform partitions from the at least one server system to initiate component testing, performing test cases for the test suites, and providing results of the test cases to the at least one server system.

13. The system of claim 12 wherein the at least one client system further comprises a hard disk drive managed as a series of partitions.

14. The system of claim 13 wherein the series of partitions further comprises a reusable scratchpad area, local data storage area, and partition management tools.

15. The system of claim 14 wherein a partition server provides the one or more associated platform partition for performing the test cases.

16. The system of claim 15 wherein the reusable scratchpad area gets overlaid with decompressed partition images from the partition server.

* * * * *